Figure 1:
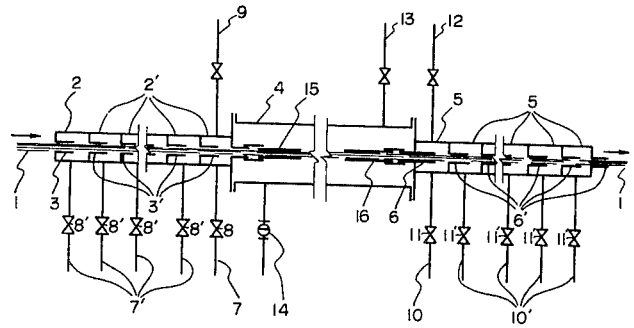
Figure 2:
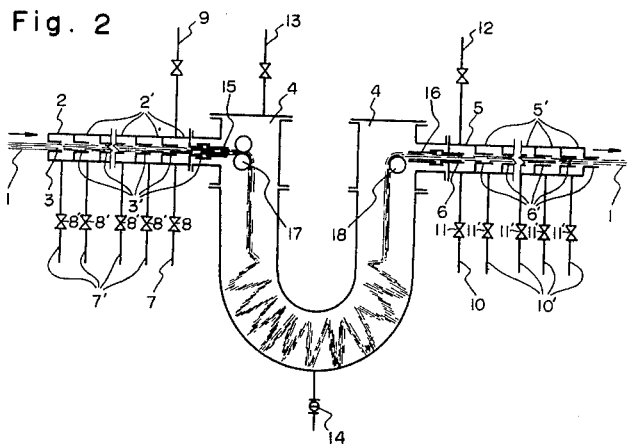
Figure 3:
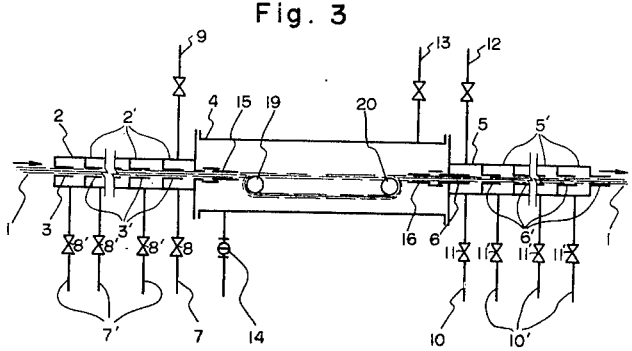

Oct. 26, 1965　　MASAHIDE YASAWA ETAL　　3,214,470
METHOD FOR THE CONTINUOUS TREATMENT OF TEXTILE
BUNDLES WITH PRESSURE STEAM
Filed Nov. 28, 1961

INVENTOR.

BY 3,214,470
AMINOSPIROCARBOALICYCLIC COMPOUNDS
Charles H. Grogan, Falls Church, Va., assignor to Tri-Kem Corporation, Washington, D.C., a corporation of the District of Columbia
No Drawing. Filed Aug. 27, 1962, Ser. No. 219,752
8 Claims. (Cl. 260—563)

The present invention relates to novel synthetic organic compounds having significant pharmacological activity and more particularly, to novel aminospiranes and their ring and exo-nitrogen substituted derivatives.

The instant application has a number of significant objects. A primary object of the present invention is to provide novel, pharmacologically reactive organic compounds characterized by their potent anesthetic properties when administered topically or subcutaneously and which are potent analgesics when administered systemically.

It is another principal object of the present invention to provide novel aminospiranes and their ring and exo-nitrogen substituted derivatives, as well as the simple acid addition salts of such compounds, all of which have important pharmacological activity.

These and further objects of the present invention will become more apparent by reference to the ensuing description and appended claims.

Formula 1 illustrates the general structural formula of the novel free bases of the present invention:

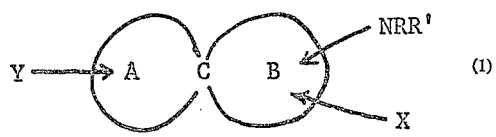

(1)

In the above formula, the spirane ring system comprises rings A and B which are interconnected by the spiro carbon atom C. Ring A is selected from the group consisting of mono- and bicarboalicyclic rings of at least 5 atoms. While there is no particular limit on the number of atoms in ring A, a ring of 5 to 15 atoms is preferred, such atoms preferably also being carbon atoms. Ring B is a carboalicyclic ring of 5 or 6 atoms (preferably carbon), one of which is substituted by an amino group, said amino group being at least one ring atom removed from the spiro carbon atom C. The amino group may be a primary amino group (R, R'=H), a secondary amino group (one of R or R'=H) or a tertiary amino group (neither R nor R'=H). R and R', in addition to hydrogen, may be one or more of lower alkyl, lower alkenyl, lower cycloalkyl, lower cycloalkenyl and phenyl-lower alkyl. Y is at least one substituent on ring A selected from the group consisting of hydrogen, lower alkyl, lower alkenyl, lower cycloalkyl, phenyl, phenyl-lower alkyl and lower alkoxy, one group substituted on ring B selected from the group consisting of hydrogen, lower alkyl, lower alkenyl, lower cycloalkyl and phenyl-lower alkyl. In the case of R and R', Y and X, the alkyl and alkenyl groups most advantageously contain from 1 to 6 chain atoms (preferably 1 to 3), although there is no upper limit within the framework of the present invention to the number of chain atoms in such groups.

In addition to the aminospirane derivatives illustrated by Formula 1, the present invention also contemplates the conversion of such aminospiranes to their acid addition salts. The majority of the aminospiranes themselves are liquids or low melting solids and are either insoluble or only sparingly soluble in aqueous media. Their conversion into stable, high-melting acid addition salts renders them more convenient to store, handle, compound and administer therapeutically, as well as increasing their solubility in aqueous media.

The acid addition salts of the compounds of the present invention are illustrated in Formula 2:

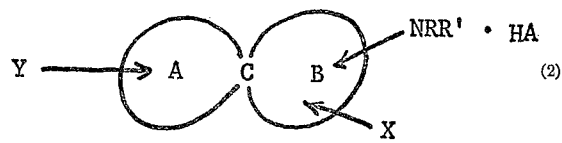

(2)

In Formula 2, all of the elements involved have the same significance set forth in the case of the corresponding elements in Formula 1. The new element HA represents the acid used in forming the acid addition salt. HA is a non-toxic acid which may be, for example, hydrochloric, hydrobromic, sulfuric, acetic, phosphoric, succinic, mucic, tartaric, maleic, malic, fumaric, etc. acids. In addition, other non-toxic acids may be employed in the salt formation so as to obtain desirable physical properites in the compounds of the present invention, i.e., stability, non-hygroscopicity and solubility, without altering the basic therapeutic properties of the parent amine.

The compounds of the present invention are extremely valuable pharmacological and medicinal agents. For example, the compound shown in the illustrative example I is a potent local anesthetic when administered locally. The administration of a 1–2.5% aqueous solution of the hydrochloride of this amine subcutaneously produces profound local anesthesia with a duration of several hours. Anesthesia of the skin, tongue and other tissues and organs to which the solution may be applied directly is rapidly induced and lasts for several hours. In dilute solution, the substance has a sweet taste when applied to the tongue. If a crystal of the solid hydrochloride is applied to the tongue, the immediate sensation is one of a bitter taste, which gradually becomes sweet as the substance dissolves and is dispersed and diluted in the aqueous mixture. In either case, rapid anesthesia is produced which lasts up to four or more hours, depending upon the amine employed and its concentration. The same sensation of bitterness and sweetness is experienced with the well-known substance, saccharin, which possesses no anesthetic properties. Saccharin in dilute solution produces an initial sweet taste while the solid form or concentrated solution of the sodium salt initially produces a bitter taste.

While the compounds of the present invention are potent local anesthetics when administered topically or subcutaneously, when administered systemically their profound pharmacological potency is indeed remarkable. More specifically, the compounds of the present invention equal or surpass in potency in the relief of pain the well-known potent narcotic, meperidine. When administered systemically in doses of from 25–150 mg., the compounds of the present invention are extremely potent analgesics.

It is thus evident from the above that the present invention involves the discovery of a novel and potent class of extremely effective anesthetics and analgesic compounds.

The compounds of the present invention are conveniently prepared from the corresponding spiroketones as illustrated by the following formulae:

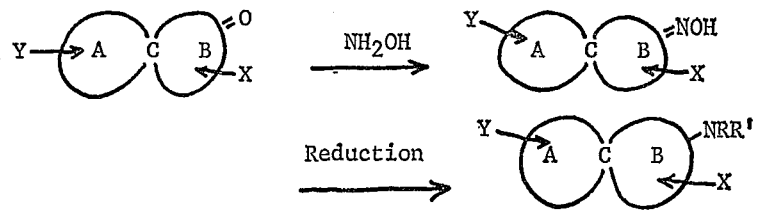

The spiroketone is converted in good yield into the oxime, which is then reduced to the corresponding primary amine. The N-substituted amines are obtained by alkylation of the primary spiroamine or by forming the appropriate amide and reduction of the carbonyl group. The derivatives in which either R or R' or both are methyl can also be prepared through the formylation of the primary amine with formaldehyde or formic acid, following by reduction to the N-substituted methyl derivatives.

Alternatively, the parent primary amines may be obtained by degradative preparation from the corresponding spiro carboxylic acids by the well-established procedures of:

(1) Treatment of the spiro carboxylic acid with hydrazoic acid in an inert solvent such as benzene or chloroform in the presence of excess sulfuric acid. This general method is known in the literature and is known as the Schmidt reaction.

(2) Treatment of the spiro carboxylic acid amide with alkali and hypochlorous or hypobromous acid in aqueous media. This general method is known in the literature and is known as the Hoffmann degradation.

The following illustrative examples of synthetic procedures involved in obtaining the novel compounds of the present invention are intended to be illustrative only and are by no means restrictive of the scope of the present invention.

*Example I.—3-aminospiro[5.5]undecane*

(A) *The oxime.*—Of the several general methods for converting carbonyl compounds into the corresponding oximes, all consist primarily of heating, or shaking the carbonyl compound with an excess of hydroxylamine hydrochloride and an excess of basic substance (such as pyridine, sodium acetate, triethylamine) to liberate the free hydroxylamine in situ in the reaction medium. This medium is generally aqueous to which sufficient alcohol may be added either to totally dissolve the carbonyl compound at once or to gradually dissolve it as the reaction proceeds. Most of the spiroketones react rapidly and in good yield in water alone even though they are largely insoluble in this substance.

Sixteen and six-tenths grams (0.1 mole) of spiro[5.5]-undecane-3-one was added to a mixture of 20 grams of sodium acetate and 20 grams of hydroxylamine hydrochloride dissolved in the minimum of water at room temperature. Although the spiroketone is relatively insoluble in water or this nearly saturated solution, and no alcohol was added, simply shaking the mixture for a few minutes resulted in a 95% yield of the crystalline oxime. The oxime was removed by filtration and washed several times with water and dried. It melted at 109–110° C. and sharply at 110° C. on recrystallization from alcohol-water.

In general, most of the other spiroketones gave good yields of the corresponding oxime by this simple procedure although, in some cases, shaking was continued for several hours on an automatic shaking device. Occasionally, the addition of alcohol facilitated the reaction.

(B) *The title amine.*—The dried oxime was finely powdered and was found to be sufficiently soluble in anhydrous ether to permit its addition to an excess of lithium aluminum hydride in anhydrous ether as a solution in ether. Some of the oximes were relatively less soluble in ether. These were added to the reducing solution of lithium aluminum hydride in ether as a finely powdered suspension or slurry in anhydrous ether.

The oxime was stirred for 4 hours in the ethereal lithium aluminum hydride solution. The mixture was then decomposed with water added at a rate so as to just maintain gentle reflux of the ether. When all hydrogen had been evolved, a slight excess of water was added and the mixture stirred for 4 additional hours and allowed to sit overnight. The inorganic material was removed by filtration and washed with ether. The ether solution was dried over anhydrous sodium sulfate, the ether stripped off and the residue distilled to yield 3-aminospiro[5.5]undecane (B.P. 110–112° C./12 mm.; 88% yield).

(C) *The amine hydrochloride.*—Solution of the free amine in anhydrous ether and bubbling in gaseous hydrogen chloride gave the hydrochloride salt which melted at 294–296° C. Recrystallization from methanol-ether gave a product having a melting point of 298–300° C.

*Example II.—N-methyl-3-aminospiro[5.5]undecane*

(A) *Formylation product.*—8.3 grams (0.05 mole) of the amine of Example I(B) was refluxed for 4 hours with 4.6 grams of formic acid in 25 ml. of alcohol. The mixture was stripped at the water pump and distilled to yield 7 gm. of N-formyl-3-aminospiro[5.5]undecane (B.P. 183–4° C./5 mm.).

(B) *The title amine.*—Reduction of the formylation product from (A) with lithium aluminum hydride gave the title amine (B.P. 112–114° C./9 mm.).

(C) *The amine hydrochloride.*—Treatment of the amine with gaseous hydrogen chloride as described in Example I(C) yielded the hydrochloride (M.P. 171–2° C.).

*Example III.—N,N-dimethyl-3-aminospiro[5.5]undecane*

(A) *The title amine.*—Reaction of 8.3 gm. (0.05 mole) of the amine from Example I(B) with 12 gm. of formic acid and 12 ml. of concentrated aqueous formaldehyde solution under reflux for 8 hrs. gave 6.3 gm. of the title amine (B.P. 122–124° C./9 mm.).

(B) *The amine hydrochloride.*—Formed as described under Example I(C) and melted at 283° C.

*Example IV.—N-butyl-3-aminospiro[5.5]undecane*

The amine from Example I(B), when reacted with n-butyryl chloride in equimolar quantity in the presence of a slight excess of 10% sodium hydroxide, yielded the n-butyryl amide. The crude amide melted at 78–80° C. and was not further purified. It was dried and reduced with lithium aluminum hydride to the title amine. The title amine was converted into its hydrochloride salt, which melted at 283–4° C.

*Example V.—N-benzyl-3-aminospiro[5.5]undecane*

(A) *The benzamide.*—Reaction of the free amine from Example I(B) with benzoyl chloride as described in Example IV gave the corresponding benzamide (M.P. 139–140° C.).

(B) *The title amine; hydrochloride.*—Reduction of the amide from (A) with lithium aluminum hydride gave the title amine, which was then converted into its hydrochloride salt (M.P. 241–2° C.). This substance was a very potent local anesthetic.

*Example VI.—N-(3-chlorobenzyl)-3-aminospiro[5.5]-undecane*

(A) *The amide.*—Reaction of the amine from Example I(B) with m-chlorobenzoyl chloride as described in Example IV gave the corresponding amine (M.P. 140–141° C.).

(B) *The title amine hydrochloride.*—Reduction of the amide from (A) with lithium aluminum hydride and treatment of the amine with hydrogen chloride gave the title amine as its hydrochloride salt (M.P. 243–4° C.).

*Example VII.—N-(4-methylbenzyl)-3-aminospiro[5.5]-undecane*

(A) *The amide.*—Reaction of the amine from Example I(B) with p-methylbenzoyl chloride as described in Example IV gave the corresponding amide (M.P. 139–140° C.).

(B) *The title amine hydrochloride.*—Reduction of the amide from (A) with lithium aluminum hydride and treatment of the resultant amine with gaseous hydrogen chloride gave the hydrochloride salt of the title amine (M.P. 262–3° C.).

*Example VIII.— 3-aminospiro[4.5]decane*

(A) *The oxime.*—This oxime was obtained as illustrated in Example I(A) from spiro[4.5]decane-3-one and melted at 80–82° C. Recrystallization from methanol-water gave a product with a M.P. of 85–86° C.

(B) *The title amine.*—Reduction of the oxime from (A) with lithium aluminum hydride gave the title amine (8 gm. from 10 gm. of the oxime) with a B.P. of 88–90° C./10 mm.).

(C) *The title amine hydrochloride.*—This was formed as described in Example I(C) and melted at 320–322° C. with decomposition.

*Example IX.—9-methyl-3-aminospiro[5.5] undecane*

(A) *The oxime.*—This was obtained from 9-methylspiro[5.5]undecane-3-one as described under Example I(A) in 1:1 alcohol-water and melted at 115–116° C.

(B) *The title amine hydrochloride.*—Reduction of the oxime from (A) with lithium aluminum hydride gave the title base, which was then converted into its hydrochloride salt (M.P. 291–293° C. with decomposition).

*Example X.—3-amino-4-benzylspiro[4.5]decane*

(A) *The oxime.*—This was formed as described in Example IX(A) from 4-benzylspiro[4.5]decane-3-one and melted at 168–169° C.

(B) *The title base hydrochloride.*—Reduction of the oxime from (A) and treatment of the resultant amine with gaseous hydrogen chloride gave the title base hydrochloride (M.P. 278–280° C.).

The procedures set forth above have been illustrated by means of a variety of spiroketones within the framework of the present invention, with variations having been made not only in the spiro structures which have previously been defined but in the Y, X, R and R' substituents on said spiro ring structures. Examples of other spiroketones which may be employed to obtain the desired products of the present invention include (but are not limited to):

spiro(5.4)decane-2-one; spiro(4.4)nonane-2-one; 7-methylspiro(4.4)nonane - 2 - one; spiro(6.4)undecane-2-one; spiro(6.5)dodecane-3-one; 8-methylspiro(5.4)decane-2-one; 9-methylspiro(5.4)decane-2-one; 4-ethyl-9-methylspiro(5.5)undecane-3-one; 9-tert-butylspiro(5.5)undecane-3-one; methoxy-spiro(5.5)undecane-3-one; 9-allyl-spiro(5.5)undecane-3-one; 9-phenylspiro(5.5)undecane-3-one; 9-cyclohexylspiro(5.5)undecane - 3 - one; spiro-trans-hexahydrohydrindene - 2,4' - cyclohexane-1'-one; spiro-trans-Decalin-2,4'-cyclohexane-1'-one; and spiro-14.4)nonadecane-2-one.

The formation of N-substituted aminospiranes was illustrated in the examples by means of butyryl chloride, benzoyl chloride and substituted benzoyl chlorides. This method is very widely applicable and a whole variety of acyl halides may be employed to obtain compounds coming within the scope of the present invention. For example, the following acyl halides are illustrative of those which may be employed to obtain amides that are readily reduced to the desired N-substituted aminospiranes: acetyl chloride, hexanoyl chloride, phenylpropionyl chloride, 4-nitrobenzoyl chloride, diphenylacetyl chloride, 4-fluorobenzoyl chloride, trimethoxybenzoyl chloride, etc.

In addition to the above, still other aminospiranes may be prepared within the framework of the present invention. For example, other values of R and R' include (but are not restricted to): allyl; crotyl; cyclohexyl; cyclohexylmethyl; cyclohexenylpropyl; cyclohexenylethyl; phenylethyl; etc. Other values of Y include (but are not restricted to): ethyl; isopropyl; cyclopentyl; benzyl; phenylethyl, ethoxy; ethyl and methyl (two Y's substituted on ring A); methyl and methyl (two Y's substituted on ring A); etc. Other values of X include (but are not restricted to): propyl; methyl; phenylethyl; chlorobenzyl; methoxybenzyl; methylbenzyl; dimethoxybenzyl; allyl; cyclohexyl; cyclohexylmethyl; cyclopentyl; etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An aminospirane selected from the group consisting of (1) compounds of the formula

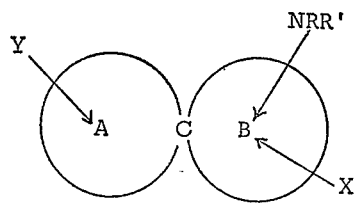

wherein A is selected from the group consisting of mono and bicarboalicyclic rings of at least 5 carbon atoms; B is a carboalicyclic ring of 5 to 6 carbon atoms; NRR' is an amino group substituted on ring B in which R and R' are selected from the group consisting of hydrogen, lower alkyl, lower alkenyl, lower cycloalkyl, lower cycloalkenyl and phenyl-lower alkyl, said amino group being on a ring carbon atom at least beta to spiro carbon atom C; Y is a substituent on ring A selected from the group consisting of hydrogen, lower alkyl, lower alkenyl, lower cycloalkyl, phenyl, phenyl-lower alkyl and lower alkoxy; and X is a substituent on ring B selected from the group consisting of hydrogen, lower alkyl, lower alkenyl, phenyl-lower alkyl and lower cycloalkyl; and (2) the therapeutically useful non-toxic acid addition salts of (1).

2. The compounds of claim 1 wherein ring A is composed of 5 to 15 ring atoms.

3. 3-aminospiro(5.5)undecane.

4. N-methyl-3-aminospiro(5.5)undecane.

5. N,N-dimethyl-3-aminospiro(5.5)undecane.

6. N-benzyl-3-aminospiro(5.5)undecane.

7. N-(3-chlorobenzyl)-3-aminospiro(5.5)undecane.
8. 3-amino-4-benzylspiro(4.5)decane.

References Cited by the Examiner

UNITED STATES PATENTS

| | | | |
|---|---|---|---|
| 2,586,487 | 2/52 | Schwartzman et al. | 260—576 |
| 2,665,302 | 1/54 | Woods et al. | 260—578 XR |

OTHER REFERENCES

Christol et al.: Bull. Soc. Chim. France, 5th Series, volume 24, pages 1027–1039 (1957).

Walter, J.A.C.S., volume 74, pages 5186 (1952).

CHARLES B. PARKER, *Primary Examiner.*

JOSEPH P. BRUST, *Examiner.*